US005253385A

United States Patent [19]

Sagawa

[11] Patent Number: 5,253,385

[45] Date of Patent: Oct. 19, 1993

[54] PIPELINE PIG SWEEPER AND SWEEPER PIN

[76] Inventor: Shizuo Sagawa, 12-8, Minamikugahara 1-chome, Ota-Ku, Tokyo, Japan

[21] Appl. No.: 902,741

[22] Filed: Jun. 23, 1992

Related U.S. Application Data

[62] Division of Ser. No. 564,085, Aug. 7, 1990.

[30] Foreign Application Priority Data

Sep. 14, 1989 [JP] Japan ........................ 1-107275

[51] Int. Cl.[5] ........................ B08B 9/04; F16L 55/26

[52] U.S. Cl. ........................ 15/104.061; 15/236.01

[58] Field of Search ........................ 15/104.061, 1, 93.1, 15/236.01, 236.06, 236.08; 29/81.02, 81.021; 299/79, 88, 91

[56] References Cited

U.S. PATENT DOCUMENTS

| | | | |
|---|---|---|---|
| 4,170,267 | 10/1979 | Bourlier | 299/88 |
| 4,244,073 | 1/1981 | Sagawa | 15/104.061 |
| 4,876,761 | 10/1989 | Sagawa | 15/104.061 |

FOREIGN PATENT DOCUMENTS

| | | | |
|---|---|---|---|
| 926679 | 10/1947 | France | 15/236.06 |
| 1214853 | 4/1960 | France | 15/104.061 |
| 0603441 | 4/1978 | U.S.S.R. | 15/104.061 |

*Primary Examiner*—Harvey C. Hornsby
*Assistant Examiner*—Tony G. Soohoo
*Attorney, Agent, or Firm*—Finnegan, Henderson, Farabow, Garrett & Dunner

[57] ABSTRACT

A sweeper for sweeping the interior space of a pipe by passing the sweeper through the pipe to remove scale form the inner surface of the pipe. The sweeper includes a body made of a resilient material, such as foamed polyurethane, and a plurality of pins projecting radially outward from the body. Each of the pins includes a head portion located outward the body and stem portion for holding the pin on the body. The head portion of the pin includes a plurality of fingers having tip end surfaces which are inclined in opposite directions relative to the direction of movement of the sweeper in the pipe.

2 Claims, 3 Drawing Sheets

PIPELINE PIG SWEEPER AND SWEEPER PIN

This is a division of application Ser. No. 07/564,085, filed Aug. 7, 1990.

BACKGROUND OF THE INVENTION

1. Field of the Invention

The present invention relates to a pipe sweeper adapted for cleaning the inside of a pipe by removing scales accumulated in the pipe and/or oxide films which may be left in the pipe around a weld of the pipe. More particularly, the present invention pertains to a pipe sweeper having pins which are adapted to be engaged with the inside surface of the pipe to thereby remove the scales and/or oxide films accumulated in the pipe. Specifically, the present invention is directed to an improvement of the pins of such pipe sweepers.

2. Description of the Prior Art

The U.S. Pat. No. 4,244,073 discloses a sweeper or a pig which is adapted to be propelled in a pipe under a water pressure for removing scales and/or slugs accumulated on the inner surface of the pipe. The sweeper has a body which is of a cylindrical configuration and made of a resilient material such as a foamed polyurethane. A plurality of pins are embedded to the body to project in radial directions. The pins are adapted to be engaged with the inner surface of the pipe and are made of a metallic material having a hardness which is a little higher than the hardness of the material constituting the pipe. Usually, the pins have a hardness in Brinell scale of approximately 150 to 160. The pin has a head which is provided with an edge portion for engagement with the inner surface of the pipe. Below the head, there is an anchor portion which is adapted to be driven into the body.

The sweeper body has a diametrical dimension which is slightly larger than the inner diameter of the pipe and water pressure is applied to the back side of the pipe to propel the body. The pins projecting radially outward from the body are forcibly engaged with the inner surface of the pipe to remove the scales and/or slugs. In operation, water spouts out forward through spaces which are formed between adjacent pairs of the pins from the space in the pipe behind the sweeper to the space ahead of the sweeper. The scales and/or slugs removed from the pipe are then carried by the water stream to be expelled from the pipe.

In this type of sweeper, it is expected that the head of each pin makes a surface contact with the inner surface of the pipe to provide the expected result of removing scales and/or slugs. However, in actual practice, it has been experienced that the pins incline rearward during the operation. This tendency is caused by the fact that the pins are forced to engage the inner surface of the pipe under a substantial pressure so that the pins tend to resist the propelling force applied by the water pressure. Usually, the head portions of the pins are of a rectangular configuration and the front corner edge engages with the inner surface of the pipe if the pins are thus inclined. The aforementioned tendency of rearward inclination of the pins therefore causes an accelerated wear of the front edge of the pin so that the pin will soon be worn at the front edge portion to such an extent that it makes a surface contact with the inner surface of the pipe in inclined positions.

A sweeper of this type is often used for scale removal at welded portions of a pipe. In this instance, the sweeper has to be driven back and forth to clean the opposite sides of the weld beads. However, if the pins are worn only at the front edges as previously described, it will become difficult to clean the back side of the weld bead by driving the sweeper in the reverse direction because in this direction surface contact can no longer maintained. Since the pins are relatively expensive, it not advantageous to replace such partly worn pins with new ones.

SUMMARY OF THE INVENTION

It is therefore an object of the present invention to provide a pin in which the aforementioned problems are avoided.

Another object of the present invention is to provide a sweeper in which a certain number of pins are always in surface contact with the inner surface of the pipe irrespective of the direction of movement of the sweeper.

A further object of the present invention is to provide a sweeper in which some of the pins are kept in surface contact with the inner surface of the pipe when the sweeper is driven in the pipe in one direction and the remainder of the pins are kept in surface contact with the inner surface of the pipe when the sweeper is driven in the opposite direction.

According to one aspect of the present invention, the above and other objects can be accomplished by a sweeper having a plurality of pins each comprising a base portion adapted to be mounted on the body and a head portion having a tip end surface which is inclined toward a longitudinal direction of the body. The pins are mounted on the body in such a way that a part of the pins have the tip end surface inclined in one direction and the remainder of the pins have the tip end surface inclined in the opposite direction. In a preferable aspect of the present invention, one half of the pins have the tip end surfaces inclined in one direction and the remaining half of the pins have the tip end surfaces inclined in the opposite direction.

According to the above features of the present invention, the tip end surfaces of the first group of the pins are brought into surface contact with the inner surface of the pipe when the sweeper is driven in one direction whereas the tip end surfaces of the second group of pins are brought into surface contact with the inner surface of the pipe when the sweeper is driven in the opposite direction. Thus, a certain number of pins are kept in surface contact at their tip end surfaces with the inner surface of the pipe irrespective of the direction of movement of the sweeper to thereby remove scales and/or slugs on the opposite sides of weld beads in the pipe.

According to another aspect of the present invention, each of the pins has a head portion comprising a pair of opposed walls which are connected together by means of an intermediate wall. The opposed walls have tip ends respectively and the tip end of one of the opposed walls is subjected to wear when the sweeper is driven in one direction and the tip end of the other of the opposed walls is subjected to wear when the sweeper is driven in the other direction. Such wear of the tip ends of the opposed walls will occur when the pin is inclined. In the case where the sweeper is driven in one direction only or where the wear of one of the opposed walls is greater than that of the other, the pins may be rotated by 180° after the tip end of one of the opposed wall is worn to a certain extent so that the other of the opposed wall is subjected to wear.

The above and other objects and features of the present invention will become apparent from the following description of preferred embodiments with reference to the accompanying drawings.

DESCRIPTION OF THE PREFERRED EMBODIMENTS

Figure 2:
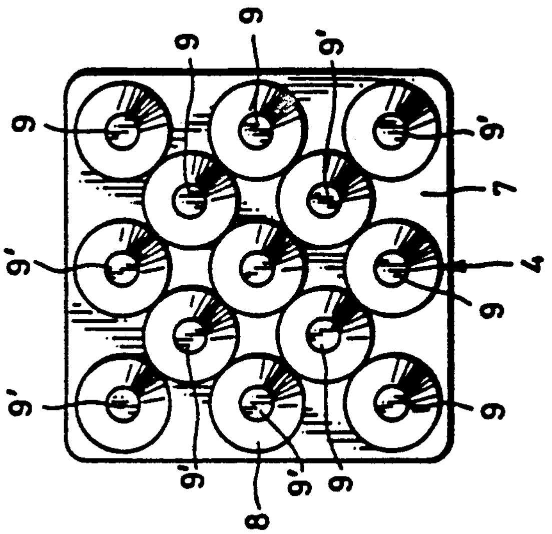
FIG. 2 is a plan view of the pin shown in FIG. 1.
Figure 1:
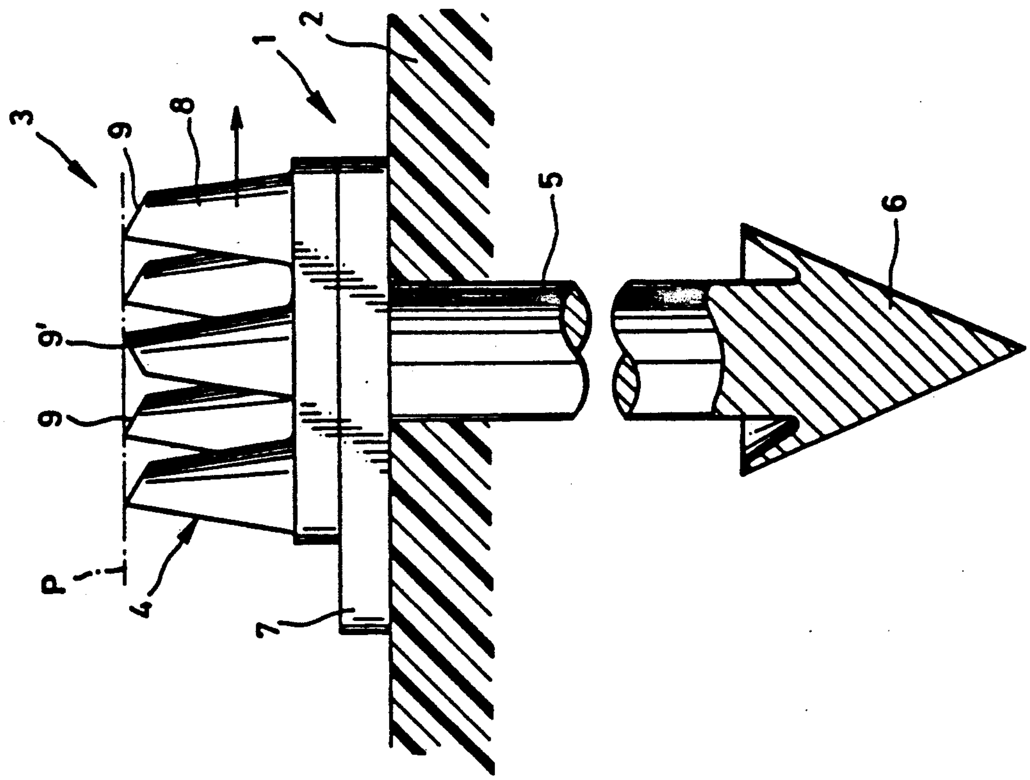
FIG. 1 is a partially sectioned side view showing one embodiment of a pin in accordance with the present invention.

Referring to the drawings, particularly to FIGS. 1 and 2, there is shown a part of a sweeper 1 having a body 2 which is made of a resin material. The body 2 may be of a cylindrical configuration. A pin 3 made of a hard material is embedded in the body 2. A plurality of such pins are embedded in the body 2 as is well known in the art. The pin 3 has a head portion 4, and a shank portion comprising a stem 5 and an anchor 6. The head portion 4 includes a base 7 of rectangular shape and a plurality of fingers 8 on the base 7 that project in a radial direction with respect to the body 2.

The stem 5 and the anchor 6 are inserted into the body 2 until the base 7 is engaged with the surface of the body 2. The anchor 6 functions to hold the pin 3 on the body 2. The sweeper 1 is driven in a manner well known in the art in one direction for example as shown by an arrow in FIG. 1. Referring to FIG. 2, it will be noted that 13 fingers 8 are of frustoconical configuration and are arranged on the base 7 in a regular pattern. As shown in FIG. 1, a part of the fingers 8 have tip end surfaces 9 which are inclined in the forward direction with respect to the axis of the fingers and the direction of movement of the sweeper 1 as shown by the arrow. The remaining fingers 8 have tip end surfaces 9' which is inclined in the opposite direction. One example of the distribution of the fingers 8 having the tip ends 9 and those having the tip ends 9' is shown in FIG. 2. It will be understood that approximately one half of the fingers 8 have the tip ends 9 and approximately one half of the fingers 8 have the tip ends 9'.

In operation, when the sweeper 1 is driven in the direction shown by the arrow in FIG. 1, the pin 3 is inclined rewardly so that the tip ends 9 are brought into surface contact with the inner surface of the pipe represented by the dotted line P. In this instance, the tip ends 9' are firmly engaged at their forward edges with the inner surfaces of the pipe P to thereby remove scales and/or slugs. The tip ends 9 which are in surface contact with the inner surface of the pipe P slide along the inner surface of the pipe and clean the back sides of the weld beads by removing the scales and/or oxides thereon.

The sweeper 1 can be driven in the opposite direction by applying water pressure to the opposite side. Then, the pin 3 is inclined in the opposite direction so that the tip ends 9' are brought into surface contact with the inner surface of the pipe P. The tip ends 9 are engaged with the inner surface of the pipe P at their edge portions so that these tip ends 9 function to remove scales and/or slugs on the inner surface of the pipe P. The tip ends 9' which are in surface contact with the inner surface of the pipe P function to clean the front side of the weld bead.

Although not shown in the drawings, the pins 3 are arranged on the body 2 so that they are not axially aligned with each other but they are circumferentially offset as viewed in the axial direction of the body 2. Further, the orientations of the pins 3 are determined so that the total number of the tip ends 9 become substantially the same as that of the tip ends 9'. In the arrangement shown in FIGS. 1 and 2, the pin 3 is provided with fingers 8 part of which have the tip ends 9 and the remainder have the tip ends 9'. It should however be noted that the pin may have fingers 8 having the tip ends inclined in one direction only. In using such pins, the orientations of the pins on the body are determined so that total number of the fingers on the pins having tip ends inclined in one direction is substantially the same as that of the fingers on the pins having tip ends inclined in the other direction.

Figure 4:
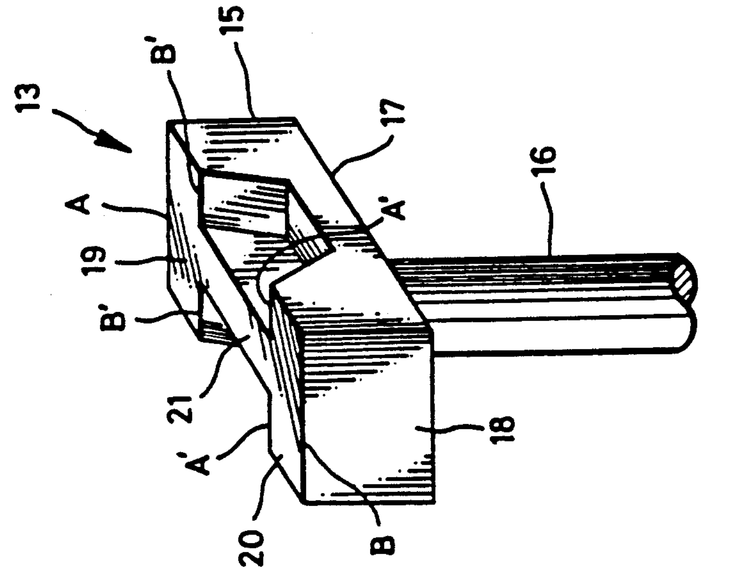
FIG. 4 is a perspective view of the pin shown in FIG. 3.
Figure 3:
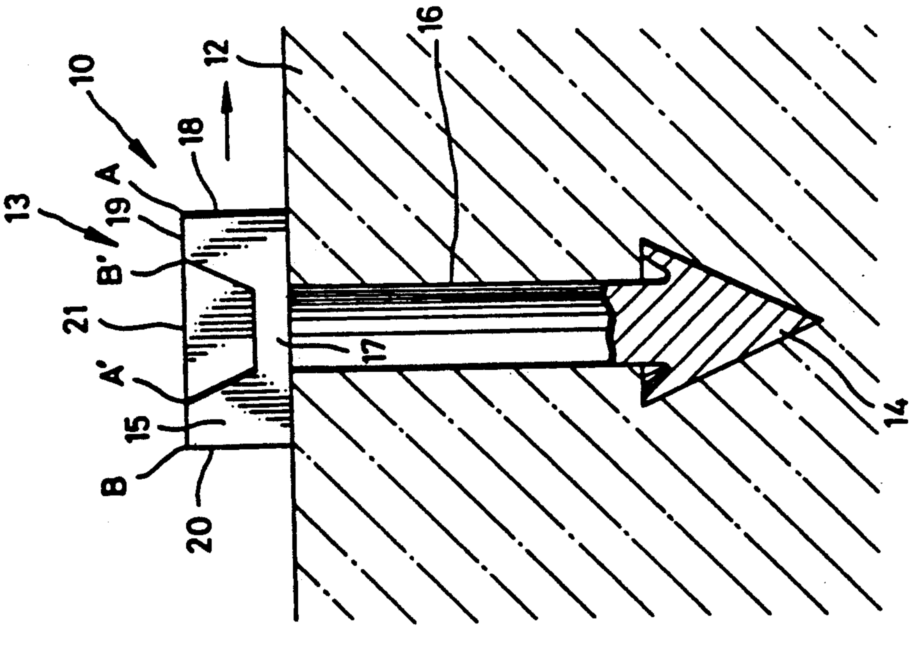
FIG. 3 is a side view similar to FIG. 1 but showing another embodiment of the present invention.
Figure 5:
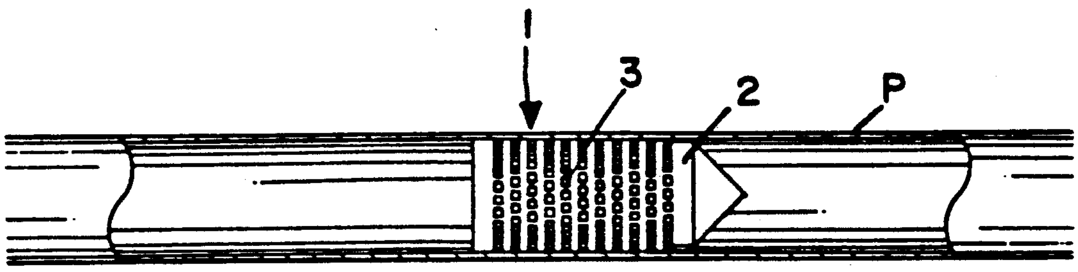
FIG. 5 is a schematic view showing the pipeline pig of the invention passing through a piece of pipe.

Referring now to FIGS. 3 and 4, there is shown a sweeper 10 in accordance with another embodiment of the present invention. In this embodiment, the sweeper 10 has a cylindrical body 12 made of a resilient material such as foamed polyurethane. A plurality of pins 13 are embedded in the body 12 that extend in a radial direction although only one of them is shown in FIG. 3. The pin 13 is made of a material which is not as hard as the material of the pipe but is to a certain extent harder than the scales and/or slugs which are to be removed from the inner surface of the pipe. One example of such material is an iron based metallic material. a shank portion having anchor means The pin 13 has 14 for holding the pin 13 on the body 12 and a head portion 15 which projects radially outward from the body 12. The anchor means 14 and the head portion 15 are connected by a stem 16 of the shank portion. The head 15 includes a base 17 and a pair of opposed upright end walls 19 and 20 projecting upwardly from the base 17. The walls 19 and 20 are connected together by an intermediate wall 21. Thus, it will be noted that the walls 19, 20 and 21 provide a substantially H-shaped consumable portion 18. The upright wall 19 has a longitudinally outer edge A and the upright wall 20 has a longitudinally outer edge B. The upright walls 19 and 20 inner wall surfaces which are opposed to each other and inclined toward the base 17. The upright wall 19 is formed with longitudinally inner edges B' and the upright wall 20 is formed with longitudinally inner edges A'.

In operation, the sweeper 10 is driven in the pipe in one direction, for example, in the direction shown by an arrow in FIG. 3. The pin 10 is then inclined rearward so that the edges A and A' are forced into engagement with the inner surface of the pipe. Thus, the upright walls 19 and 20 are worn in the areas adjacent to the edges A and A'. When the sweeper 10 is driven in the opposite direction, the edges B and B' on the upright walls 20 and 19, respectively, are forced into engagement with the inner surface of the pipe so that wear of the head 15 progresses in the areas adjacent to the edges B and B'. In the case where the sweeper 10 is driven in one direction only, the orientation of the pin 13 may be changed when the areas in the vicinity of the edges A and A' are worn to a certain extent so that the edges B and B' are subjected to wear in following operations.

The operation is repeatedly continued until the consumable portion 18 is worn off.

The invention has thus been shown and described with reference to specific embodiments. However, it should be noted that the invention is in no way limited to the details of the illustrated structures but changes and modifications may be made without departing from the scope of the appended claims.

I claim:

1. A sweeper for cleaning the interior surface of a pipe by passing the sweeper in a longitudinal direction through the pipe, said sweeper comprising a generally cylindrical shaped body of a resilient material having an outer peripheral surface and a plurality of pins that project radially outward from said surface of said body, each of said pins comprising a head portion located outwardly of said body and a shank portion embedded in the body having anchor means for holding said pin in said body, said head portion having a base side adjacent the peripheral surface of said body and a top side radially remote therefrom and comprising a pair of spaced and opposed upright end walls extending from said base side to said top side and connected to each other by a intermediate wall to form a substantially H-shaped configuration on the top side of the head portion, the intermediate wall extending in the direction of movement of said sweeper in said pipe when said pins are embedded in said body.

2. A pin for a sweeper for cleaning the interior surface of a pipe by passing the sweeper in a longitudinal direction through the pipe, the sweeper having a generally cylindrical shaped body of a resilient material and having an outer peripheral surface with a plurality of said pins projecting radially outward therefrom, said pin comprising a head portion adapted to project outwardly of the body and a shank portion adapted to be embedded in said body and having anchor means for holding said pin in the body, said head portion having a base side adapted to lie adjacent the peripheral surface of the body and a top side radially remote therefrom, said head portion comprising a pair of spaced and opposed upright end walls extending from the base to the top side thereof and connected to each other by an intermediate wall to form a substantially H-shaped configuration on the top side of the head portion, the intermediate wall extending in the direction of movement of the sweeper through the pipe when the pin is secured in the body.

* * * * *